United States Patent
Murawski et al.

(10) Patent No.: US 8,200,954 B2
(45) Date of Patent: Jun. 12, 2012

(54) MULTI-STAGE BOOT PIN SAMPLING

(75) Inventors: Piotr M. Murawski, Wroclaw (PL); Marcin Nowak, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 488 days.

(21) Appl. No.: 12/415,055

(22) Filed: Mar. 31, 2009

(65) Prior Publication Data

US 2010/0011202 A1 Jan. 14, 2010

(30) Foreign Application Priority Data

Jul. 8, 2008 (EP) ..................................... 08290676

(51) Int. Cl.
*G06F 1/06* (2006.01)
*G06F 9/00* (2006.01)
(52) U.S. Cl. ............... 713/2; 713/1; 702/117; 327/365
(58) Field of Classification Search .................. 713/1, 2; 702/117; 327/365
See application file for complete search history.

(56) References Cited

U.S. PATENT DOCUMENTS

| | | | | |
|---|---|---|---|---|
| 5,329,634 A * | 7/1994 | Thompson | ........................ | 710/8 |
| 5,544,092 A * | 8/1996 | Gunther et al. | .................... | 713/1 |
| 5,818,206 A * | 10/1998 | Titus et al. | .................... | 323/285 |
| 5,923,894 A * | 7/1999 | Sollars | ............................ | 712/38 |
| 6,625,731 B1 * | 9/2003 | Plourde | ......................... | 713/100 |
| 6,865,703 B2 * | 3/2005 | Shimomura et al. | .......... | 714/726 |
| 6,988,211 B2 * | 1/2006 | Cline et al. | .................... | 713/300 |
| 2007/0001518 A1 * | 1/2007 | Lee | ............................. | 307/112 |
| 2007/0171708 A1 * | 7/2007 | Tedrow et al. | ........... | 365/185.03 |
| 2009/0295409 A1 * | 12/2009 | Irkliy | ............................. | 324/658 |
| 2010/0088547 A1 * | 4/2010 | Chang | ............................ | 714/36 |

* cited by examiner

*Primary Examiner* — Kim Huynh
*Assistant Examiner* — Zahid Choudhury
(74) *Attorney, Agent, or Firm* — Alan A. R. Cooper; Wade James Brady, III; Frederick J. Telecky, Jr.

(57) ABSTRACT

In accordance with embodiments, a method for configuring an electronic device during a power-on sequence includes sampling a boot pin state multiple times. The method also includes storing a value corresponding to each sampled boot pin state, wherein the stored values comprise one of four different states for a single boot pin.

21 Claims, 3 Drawing Sheets

MULTI-STAGE BOOT PIN SAMPLING

CROSS-REFERENCE TO RELATED APPLICATIONS

The present application claims priority to EP patent application Serial No. 08290676.9, filed Jul. 8, 2008, entitled "Double Chip Booting Configuration" and hereby incorporated herein by reference.

BACKGROUND

Many electrical devices are able to operate in different modes based on configuration information provided during a power-on sequence. For example, during the power-on sequence, an electrical device may gather the configuration information from pin states (e.g., from "System Booting Pins"). The configuration information is subsequently used to select a device's mode of operation. As devices become more complicated, the number of different modes which can be supported increases. For example, some System on Chip (SoC) devices may have several hundred pins and dozens of modes.

Using dedicated pins to provide configuration information is sometimes undesirable since the number of pins in a chip design is limited and changes to pins assignments (or new pin assignments) may be needed later. Further, using re-programmable pins to provide configuration information carries a greater risk of pin states being accidently changed due to the additional circuitry (additional paths that potentially affect a pin's state) coupled to re-programmable pins.

SUMMARY

In at least some embodiments, a method for configuring an electronic device during a power-on sequence comprising selectively changing a boot pin state. The method further comprises sampling the boot pin state multiple times and storing a value corresponding to each sampled boot pin state.

In at least some embodiments, a system comprises a boot pin interface having multi-stage sampling logic assigned to at least one boot pin. For each assigned boot pin, the multi-stage sampling logic samples a boot pin state during each of multiple stages. The system further comprises boot code selection logic that selects one of a plurality of boot codes based on the sampled boot pin states. The system further comprises boot code execution logic that executes the selected boot code.

In at least some embodiments, multi-stage sampling logic for a boot pin comprises a staging switch coupled to the boot pin, wherein the staging switch selectively transitions from a first stage to a second stage. The multi-stage sampling logic further comprises a storage medium that stores a first boot pin state sampled during the first stage and second boot pin state sampled during the second stage.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Also, the term "virtual time/date" or "virtual time reference" refers to a time/date that is derived from a time/date generator, but is not the time/date generator's value. For example, a virtual time/date can be represented by a time/date generator value plus an offset. Also, the term "secure time/date" or "secure time reference" refers to a time/date that is not changeable or that is only changeable by a trusted authority.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As disclosed herein, embodiments of the disclosure are directed to electronic devices that sample boot pin states and store corresponding values for use as configuration information. In at least some embodiments, the state of at least one boot pin is sampled multiple times (e.g., two times) during a power-on sequence or boot sequence. The boot pin state is selectively changed during the sampling process such that at least two-bits of information (at least four states) can be provided by each boot pin. In this manner, the total number of boots pins that are relied upon for configuration information can be reduced.

Figure 1:
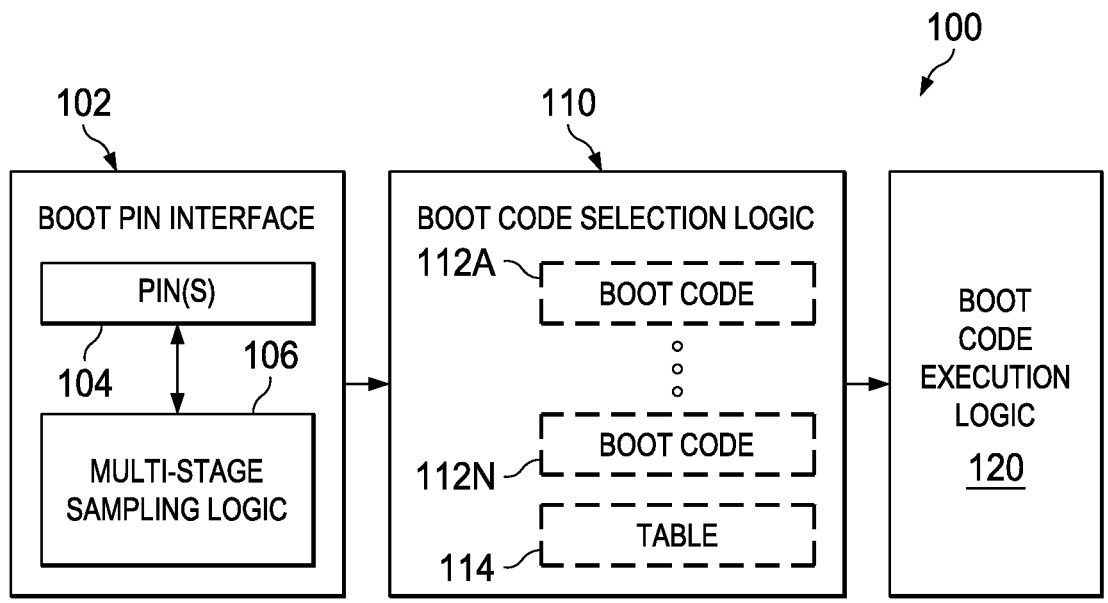
FIG. 1 illustrates a system in accordance with an embodiment of the disclosure.

FIG. 1 illustrates a system 100 in accordance with an embodiment of the disclosure. As shown, the system 100 comprises a boot pin interface 102 having at least one pin 104 and multi-stage sampling logic 106. In accordance with embodiments, the multi-stage sample logic 106 gathers multiple samples of the state (voltage level) of the pin 104 during a power-on sequence. The values corresponding to the samples are provided to the boot code selection logic 110 as a multi-bit control signal for selecting one of a plurality of boot codes 112A-112N for execution by the boot code execution logic 120. As an example, upon retrieving or receiving the boot code selection logic 110 from the boot pin interface 102, the boot code selection logic 110 may access a table 114 to match the multi-bit control signal to one of the boot codes 112A-112N. Execution of a particular boot code 112A-112N enables a host electronic device to have a desired configuration or mode of operation.

Figure 2:
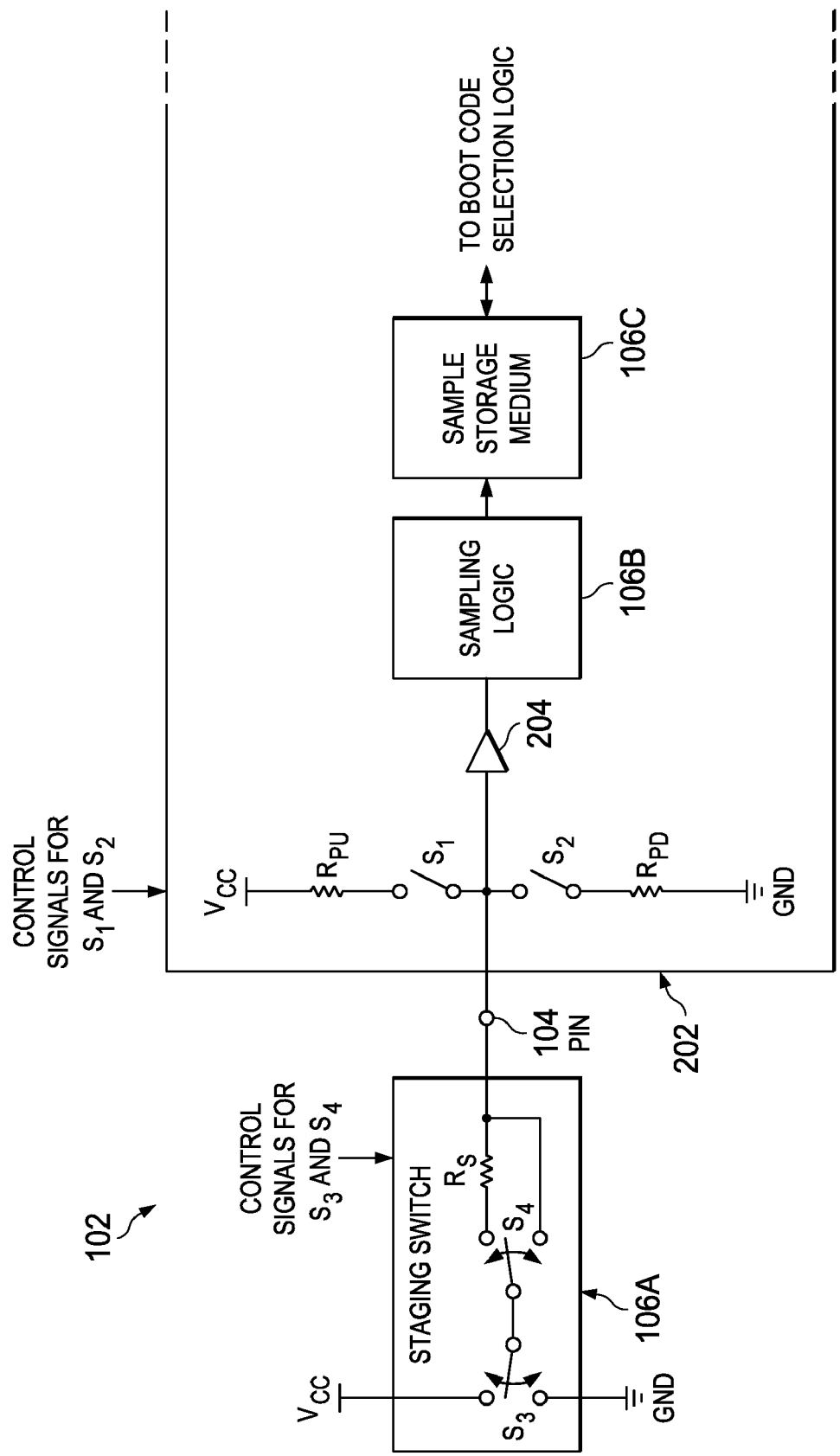
FIG. 2 illustrates an embodiment of the boot pin interface of FIG. 1 in accordance with the disclosure.

FIG. 2 illustrates an embodiment of the boot pin interface 102 of FIG. 1 in accordance with the disclosure. As shown, the boot pin interface 102 comprises a semiconductor chip 202 having the pin 104. The semiconductor chip 202 also comprises a pull-up resistor ($R_{PU}$) that selectively couples to the pin 104 via a switch ($S_1$) and a pull-down resistor ($R_{PD}$) that selectively couples to the pin 104 via another switch ($S_2$). The chip 202 also comprises an input buffer 204 that stores the state (high voltage or low voltage) of the pin 104.

In the embodiment of FIG. 2, the multi-stage sampling logic 106 mentioned previously comprises various components including a staging switch 106A, sampling logic 106B, and a sample storage medium 106C. As shown, the staging switch 106A comprises two switches ($S_3$ and $S_4$). $S_3$ selectively couples an external high voltage (e.g., VCC) or low voltage (e.g., GND) to the pin 104. Meanwhile, $S_4$ selectively couples a staging resistor ($R_S$) between the external voltage (high or low) and the pin 104. In accordance with embodiments, the value of $R_S$ is greater than the value of $R_{PU}$ or $R_{PD}$ so as to enable different pin states when $R_{PU}$ or $R_{PD}$ is coupled to the pin 104 as will be described in greater detail. As an example, in some embodiments, $R_{PU}$ or $R_{PD}$ may have a value of 1 kohm and $R_S$ may have a value of 10 kohm.

In accordance with at least some embodiments, the state of pin 104 is captured during each of a first sampling stage and a second sampling stage. Table 1 shows switch configuration information for the multi-stage sampling logic 106 in accordance with an embodiment.

TABLE 1

| Pre-set | | Stage 1 | | Stage 2 | | Multi-stage pin state |
|---|---|---|---|---|---|---|
| $S_3$ | $S_4$ | $S_1$ and $S_2$ open | pin state | $S_1$ or $S_2$ closed | pin state | |
| GND | Couple $R_S$ | Yes | Low | $S_1$ | High | Low-High |
| GND | Bypass $R_S$ | Yes | Low | $S_1$ | Low | Low-Low |
| VCC | Couple $R_S$ | Yes | High | $S_2$ | Low | High-Low |
| VCC | Bypass $R_S$ | Yes | High | $S_2$ | High | High-High |

In Table 1, the pin states during stage 1 and stage 2 vary depending on the configuration of the switches: $S_1$, $S_2$, $S_3$, and $S_4$. As shown, $S_3$ and $S_4$ are preset before the sampling stages begin. In accordance with some embodiments, $S_3$ and $S_4$ should be set even before a power-on sequence begins. For example, a particular device configuration or mode of operation may be selected during a previous power-on sequence, runtime process, shutdown process, or mechanical configuration of switches $S_3$ and $S_4$. By pre-setting $S_3$ and $S_4$ before the power-on sequence begins, desired control code bits are sampled during stage 1 and stage 2 with minimal risk of error and with simple controls.

During stage 1, the sampling logic 106B samples the state of the pin 104 with $S_1$ and $S_2$ open. For example, if $S_1$ and $S_2$ may be open by default during a power-on sequence. If GND is coupled to the pin 104, the sampling logic 106B captures a logical "low" or "0" as the pin state regardless of whether $R_S$ is coupled or bypassed. If VCC is coupled to the pin 104, the sampling logic 106B captures a logical "high" or "1" as the pin state regardless of whether $R_S$ is coupled or bypassed. Thus, stage 1 may be considered to be an external voltage detection stage (i.e., stage 1 enables detection of whether pin 104 is connected to VCC or GND). The pin state value captured by the sampling logic 106B is forwarded to the sample storage medium 106C, which corresponds to a register or other storage medium that stores bits representative of the sampled pin states.

During stage 2, either $S_1$ or $S_2$ is selectively closed. For example, if the pin state during stage 1 is a logical "low", then $S_1$ is closed and $S_2$ remains open during stage 2. Alternatively, if the pin state during stage 1 is a logical "high", then $S_2$ is closed and $S_1$ remains open during stage 2. For stage 2, the sampling logic 106B captures a logical "high" or "1" as the pin state if: $S_3$ couples to GND, $S_4$ couples $R_S$ between $S_3$ and the pin 104, $S_1$ is closed, and $S_2$ is open. Alternatively, for stage 2, the sampling logic 106B captures a logical "low" or "0" as the pin state if: $S_3$ couples to GND, $S_4$ bypasses $R_S$, $S_1$ is closed, and $S_2$ is open. Alternatively, for stage 2, the sampling logic 106B captures a logical "low" or "0" as the pin state if: $S_3$ couples to VCC, $S_4$ couples $R_S$ between $S_3$ and the pin 104, $S_1$ is open, and $S_2$ is closed. Alternatively, for stage 2, the sampling logic 106B captures a logical "high" or "1" as the pin state if: $S_3$ couples to VCC, $S_4$ bypasses $R_S$, $S_1$ is open, and $S_2$ is closed. Thus, stage 2 may be considered to be an external resistor detection stage (i.e., stage 2 enables detection of whether pin 104 is connected directly to VCC/GND or indirectly thru $R_S$).

Thus, by appropriately controlling the configuration of $S_1$, $S_2$, $S_3$, and $S_4$, the sampling logic 106B selectively captures a multi-stage pin state of low-low ("00"), high-high ("11"), low-high ("01") or high-low ("10") as shown in Table 1. In accordance with at least some embodiments, the configuration of $S_1$, $S_2$, $S_3$, and $S_4$ are determined by control signals provided to the semiconductor chip 202 and the staging switch 106A. More specifically, control signals for $S_1$ and $S_2$ are provided to the semiconductor chip 202, and control signals for $S_3$ and $S_4$ are provided to the staging switch 106A. In accordance with embodiments, the provision of these control signals is coordinated with the operation of the sampling logic 106B to ensure accurate pin state sampling. For example, the configuration of $S_3$ and $S_4$ may be pre-set before a power-on sequence begins and the configuration of $S_1$ and $S_2$ may be changed from a default configuration (open) to a stage 2 configuration as needed.

Performing the multi-stage sampling operation results in the storage medium 106C storing at least two bits of information for each boot pin associated with the multi-stage sampling logic 106. For example, if there are three boot pins associated with the multi-stage sampling logic 106, the sample storage medium 106C may store up to 6 bits of information based on sampled pin states. In such case, the boot code selection logic 110 may rely on up to six bits of information (allowing up to $2^6$ possible configurations) to select a device configuration or mode of operation. As needed, additional boot pins would enable additional bits of information to be gathered. In general, the number of boot pins may vary depending on the number of possible configurations, or modes of operation, that may be selected for a given electronic device.

Figure 3:
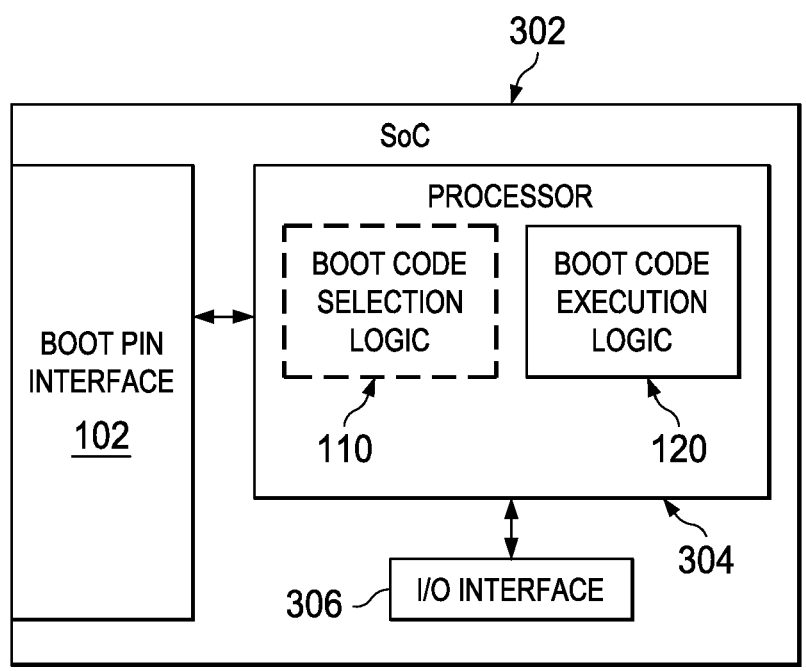
FIG. 3 illustrates a System on Chip (SoC) in accordance with an embodiment of the disclosure.

FIG. 3 illustrates a System on Chip (SoC) 302 in accordance with an embodiment of the disclosure. As shown, the SoC 302 comprises the boot pin interface 102 coupled to a processor 304 having the boot code selection logic 110 and the boot code execution logic 120 described for FIG. 1. As an example, the boot code selection logic 110 may comprise software instructions that are stored by, or that are accessible to, the processor 304. Such software instructions may alternatively be stored in an external memory device coupled to and accessible by the processor 304. The boot code execution logic 120 comprises hardware components for executing instructions such as boot code selection instructions that are representative of the boot code selection logic 110. In alternative embodiments, boot code selection logic 110 and the boot code execution logic 120 represent hardware and/or software that is separate from the processor 304. Without regard to the particular implementation of the boot code selection logic 110 and the boot code execution logic 120, the boot pin interface 102 is able to provide configuration information based on multi-stage boot pin samples as previously described. During a power-on sequence or boot sequence, this configuration information enables selection of a desired configuration or mode of operation for the SoC 302 (or a device implementing the SoC 302). As shown, the SoC 302 may further comprise an I/O interface 306 that enables communications between SoC components such as the processor 304 and non-SoC components external to the SoC 302.

Without limitation to other embodiments, the SoC 302 may represent an Open Multimedia Applications Protocol (OMAP) series processor. OMAP processors (e.g., the OMAP 3430 processor) have built-in support for various technologies compatible with third-generation (3G) cell phones or smart phones. The technologies supported by an OMAP processor (or similar SoC) may be categorized into groups such as multimedia, gaming, graphics, imaging, software, security, and power management. Further, each technology may have associated therewith different implementations or versions. As one of skill in the art will appreciate, not all the technologies that are built into an OMAP processor need to be active for a given device or for a given "runtime" of a device. Thus, the different technology modules or sub-modules (hardware or software modules) corresponding to different technologies may be selectively activated or de-activated. In accordance with various embodiments, the activation or de-activation or technology modules (or sub-modules) occurs during a power-on sequence or boot sequence and is based on configuration information that is acquired using the multi-stage boot pin sampling technique described herein.

Figure 4:
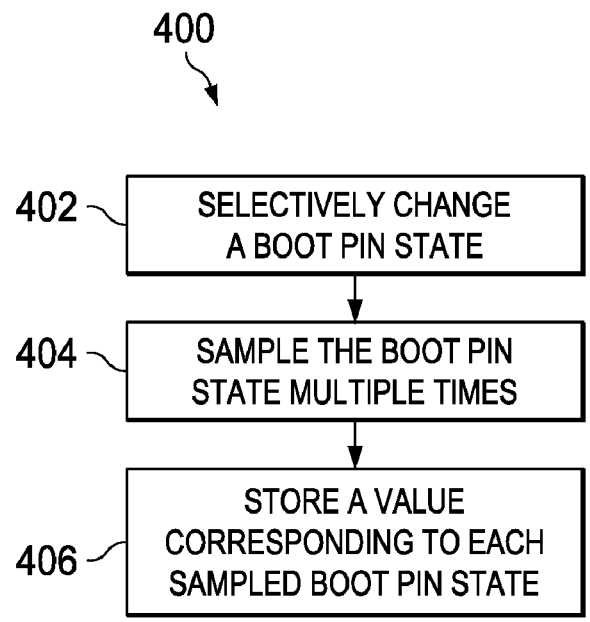
FIG. 4 illustrates a method for configuring an electronic device during a power-on sequence in accordance with an embodiment of the disclosure.

FIG. 4 illustrates a method 400 for configuring an electronic device during a power-on sequence in accordance with an embodiment of the disclosure. As shown, the method 400 comprises selectively changing a boot pin state (block 402). In at least some embodiments, selectively changing the boot pin state may involve connecting a pull-up resistor or a pull-down resistor to a boot pin after a first sampling and before a second sampling. Further, selectively changing the boot pin state may involve selectively connecting an external high voltage or external low voltage to the boot pin. Further, selectively changing the boot pin state may involve selectively connecting a staging resistor between the external high voltage or external low voltage and the boot pin. As shown, the method 400 further comprises sampling the boot pin state multiple times (block 404) and storing a value corresponding to each sampled boot pin state (block 406). In accordance with at least some embodiments, the stored values comprise four different states for a single boot pin. The method 400 may comprise additional or fewer steps. For example, the method 400 may further comprise selecting a boot code for execution based on the stored boot pin state values. In at least some embodiments, the method 400 is performed by a System on Chip (SoC).

Figure 5:
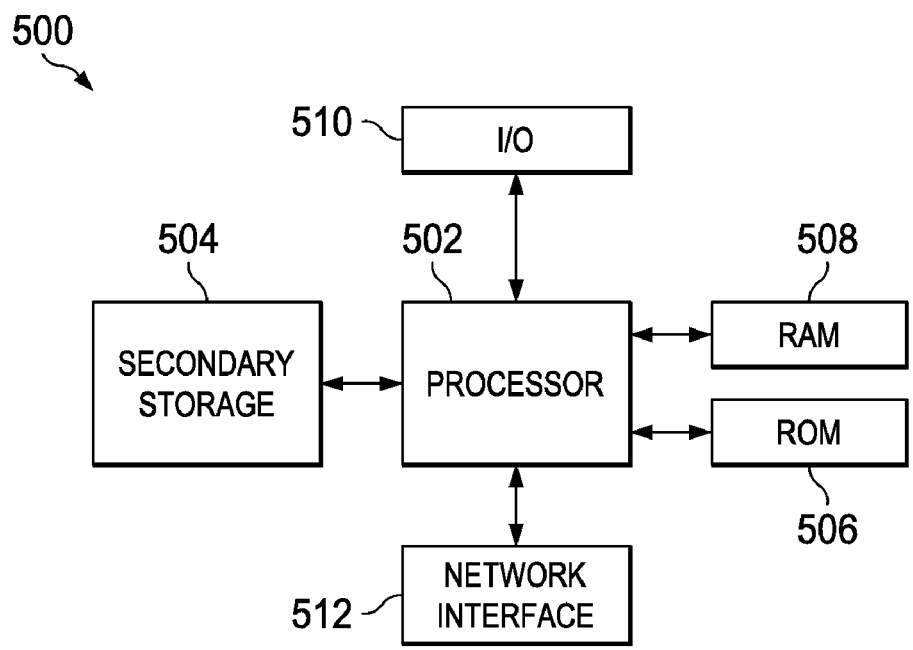
FIG. 5 illustrates a computer system in accordance with an embodiment of the disclosure.

The multi-stage pin sampling technique described herein may be implemented on a computer system having at least one semiconductor chip with boot pins. More specifically, mobile computer systems (e.g., palm-size devices) that implement SoCs may benefit from multi-stage pin sampling technique. FIG. 5 illustrates a computer system 500 in accordance with an embodiment of the disclosure. As shown, the computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and a network interface 512. The processor may be implemented as one or more CPU chips. The processor 502 executes instructions, codes, computer programs, or scripts which it accesses from secondary storage 504, ROM 506, RAM 508, or the network interface 512.

The secondary storage 504 is typically comprised of one or more disk drives or flash drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. In some embodiments, the ROM 506 is a non-volatile memory device which typically has a small memory capacity relative to the larger memory capacity of secondary storage 504. Meanwhile, the RAM 508 is used to store volatile data and perhaps to store instructions. Access to both ROM 506 and RAM 508 is typically faster than access to secondary storage 504.

The I/O devices 510 may include printers, video monitors, liquid crystal displays (LCDs), touch screen displays, keyboards, keypads, switches, dials, mice, track balls, voice recognizers, card readers, or other well-known input devices. The network interface 512 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards (e.g., code division multiple access (CDMA) and/or global system for mobile communications (GSM) radio transceiver cards), GPS, short range wireless transceivers (Bluetooth, Zigbee, etc.), Near Field Communication (NFC) transceivers (e.g. RFID), and other well-known network devices. The network interface 512 may enable the processor 502 to communicate via the Internet or available intranets. In accordance with embodiments, the configuration or mode of operation of the computer system 500 is determined based on configuration information obtained using the multi-stage boot pin sampling technique disclosed herein.

It is understood that by programming and/or loading executable instructions onto the computer system 500 to enable the multi-stage boot pin sampling technique, at least some components (e.g., the secondary storage 504, the RAM 508, or the ROM 506) are changed, transforming the computer system 500 into a specialized and/or a new machine having the novel functionality taught by the present disclosure. It is fundamental to the electrical and software engineering arts that a design that can be implemented in software, for bringing into service by loading executable software into a general purpose computing system and launching the software, can be converted to a hardware implementation by well known design rules. Decisions between delivering a design for a system and/or for an article of manufacture in a software implementation versus a hardware implementation typically hinge on considerations of the stability of the design and the number of units to be produced, rather than on any issues involved in translating the design from a software implementation to a hardware implementation. As an example, a software implementation may be preferred when a design is still subject to frequent change, because re-spinning a software implementation may be less expensive than re-spinning a hardware implementation. Meanwhile, a hardware implementation (e.g., an application specific integrated circuit (ASIC) implementation) may be preferred when a design is stable and the subject article of manufacture is to be produced in large volume, because for large production runs the hardware implementation may be less expensive than the software implementation. In some development processes, a design may be developed, tested, and iteratively refined in a software implementation and later transformed, by well known design rules, to a hardware implementation (e.g., an ASIC that hardwires the instructions of the software. In the same manner as a machine controlled by a new ASIC is a different and/or a new machine, likewise a general purpose computer that has been programmed and/or loaded with new executable instructions may be viewed as a new and/or a different machine.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for configuring an electronic device during a power-on sequence, comprising:
    sampling a boot pin state multiple times with use of a multi-stage sampling logic having a first switch, a second switch, a third switch, and a fourth switch, the sampling comprising:
        a) presetting the third and fourth switch, wherein the third switch selects between two voltage levels;
        b) sampling a first sample of the boot pin state, wherein the boot pin is sampled with:
            i) the first switch, coupled to a pull up resistor, open; and
            ii) the second switch, coupled to a pull down resistor, open;
        c) storing a first value corresponding to the first sampled boot pin state,
        d) connecting the pull-up resistor or the pull-down resistor to the boot pin, through closing the first switch or the second switch, respectively, after the first sampling of the boot pin state and before a second sampling of the boot pin state and
        e) transitioning the fourth switch between a connection and a non-connection to a staging resistor after the first sampling of the boot pin state and before a second sampling of the boot pin state,
        f) sampling the second sample of the boot pin state after the connecting of the pull-up resistor or the pull-down resistor and the transitioning of the fourth switch,
        g) storing a second value corresponding to the second boot pin state,
    wherein the stored values comprise one of four different states for a single boot pin in a boot code selection logic.

2. The method of claim 1 further comprising selecting a boot code for execution based on the stored values.

3. The method of claim 1 further comprising pre-setting the third switch, prior to the power-on sequence, to couple an external high voltage or external low voltage to the boot pin.

4. The method of claim 3 further comprising pre-setting the fourth switch, prior to the power-on sequence, to couple or bypass a staging resistor ($R_s$) between the third switch and the boot pin.

5. The method of claim 1 wherein said selectively changing, said sampling, and said storing is performed by a System on Chip (SoC).

6. A system, comprising:
    a boot pin interface having multi-stage sampling logic assigned to at least one boot pin, the multi-stage sampling logic including a first stage and a second stage;
    the first stage comprising:
        a third switch and a fourth switch, wherein the third switch selects between two voltage levels and the fourth switch which selectively adds a staging resistor between the selected voltage level at a selected boot pin of the at least one boot pin, wherein the third and fourth switches are preset,
    the second stage comprising:
        a first switch and a second switch, wherein the first switch is coupled to a pull up resistor, and the second switch is coupled to a pull down resistor, and
    wherein, for each assigned boot pin, the multi-stage sampling logic samples a boot pin state during each of multiple stages wherein the multi-stage sampling logic:
        a) connects the pull-up resistor or the pull-down resistor to the boot pin, through the fist switch or the second switch, respectively, after a first sampling of the boot pin state and before a second sampling of the boot pin state;
        b) transitions the fourth switch between a connection and a non-connection to the staging resistor between the selected voltage level and the associated boot pin after the first sampling of the boot pin state and before the second sampling of the boot pin state,
        c) generates a first value for the first sampling and a second value for the second sampling;
    boot code selection logic that selects one of a plurality of boot codes based on the sampled first and second values of the boot pin states of each assigned selected boot pin; and
    boot code execution logic that executes the selected boot code.

7. The system of claim 6 wherein the first switch and the second switch are set prior to a power-on sequence in which the associated boot pin is sampled.

8. The system of claim 6 wherein a value of the staging resistor is greater than a pull-up resistor value and a pull-down resistor value for the associated boot pin.

9. The system of claim 6 wherein the multi-stage sampling logic comprises a storage medium that stores bits representative of sampled boot pin states.

10. The system of claim 9 wherein the storage medium stores at least two bits for each boot pin assigned to the multi-stage sampling logic.

11. The system of claim 9 wherein the boot code selection logic reads at least six bits representative of sampled boot pin states from the storage medium to select one of the plurality of boot codes.

12. The system of claim 6 wherein said boot pin interface, said boot code selection logic and said boot code execution logic are components of a System on Chip (SoC).

13. Multi-stage sampling logic for a boot pin, comprising:
    a plurality of switches coupled to the boot pin, wherein different configurations of the switches cause a boot pin state associated with the boot pin to vary, wherein the plurality includes a first switch, a second switch, a third switch, and a fourth switch, wherein the third and fourth switch are preset;

sampling logic to sample a first boot pin state during a first stage of sampling and a second boot pin state during a second stage of sampling;

a first stage of the multi-stage sampling logic comprising the third switch and the fourth switch, wherein the third switch selects between two voltage levels and the fourth switch transitions between a connection and a non-connection of a staging resistor between the selected voltage level and the associated boot pin, the second stage comprising the first switch and a second switch, wherein the first switch is coupled to a pull up resistor, and the second switch is coupled to a pull down resistor, and wherein, for each assigned boot pin, the multi-stage sampling logic samples a boot pin state during each of multiple stages; wherein the multi stage sampling logic:

a) connects the pull-up resistor or the pull-down resistor to the boot pin, through the third switch or the fourth switch, respectively, after the first sampling of the boot pin state, and before a second sampling of the boot pin state;

b) transitions the fourth switch between the connection and the non-connection to the staging resistor between the selected voltage level and the associated boot pin after the first sampling of the boot pin state and before the second sampling of the boot pin state;

c) generates a first value for the first sampling and a second value for the second sampling; and a storage medium configured to store the first sampled boot pin state value and the second sampled boot pin state value.

14. The multi-stage sampling logic of claim 13 wherein the multi-stage sampling logic identifies four states of the boot pin.

15. The multi-stage sampling logic of claim 14 wherein the multi-stage sampling logic identifies a first state ("low-high") as occurring when, during the first stage, the sampling logic detects that the boot pin is externally tied to a low voltage, and during the second stage, the sampling logic detects that an external resistor is between the low voltage and the boot pin.

16. The multi-stage sampling logic of claim 14 wherein the multi-stage sampling logic identifies a second state ("low-low") as occurring when, during the first stage, the sampling logic detects that the boot pin is externally tied to a low voltage, and during the second stage, the sampling logic detects that an external resistor is not between the low voltage and the boot pin.

17. The multi-stage sampling logic of claim 14 wherein the multi-stage sampling logic identifies a third state ("high-low") as occurring when, during the first stage, the sampling logic detects that the boot pin is externally tied to a high voltage (VCC), and during the second stage, the sampling logic detects that an external resistor is between the high voltage (VCC) and the boot pin.

18. The multi-stage sampling logic of claim 14 wherein the multi-stage sampling logic identifies a third state ("high-high") as occurring when, during the first stage, the sampling logic detects that the boot pin is externally tied to a high voltage (VCC), and during the second stage, the sampling logic detects that an external resistor is not between the high voltage (VCC) and the boot pin.

19. The method of claim 1, wherein the first sampling determines whether the pin is coupled to a high voltage source or to a lower voltage source.

20. The method of claim 19, wherein the second sampling determines whether the pin is coupled either directly or through a staging resistor to the high voltage source or to the lower voltage source.

21. The method of claim 20, wherein the lower voltage source is a ground.

* * * * *